C. S. JOHNSON.
MEANS FOR OPERATING AND CONTROLLING BRAKES, CLUTCHES, &c.
APPLICATION FILED MAY 29, 1917.
1,298,956.
Patented Apr. 1, 1919.
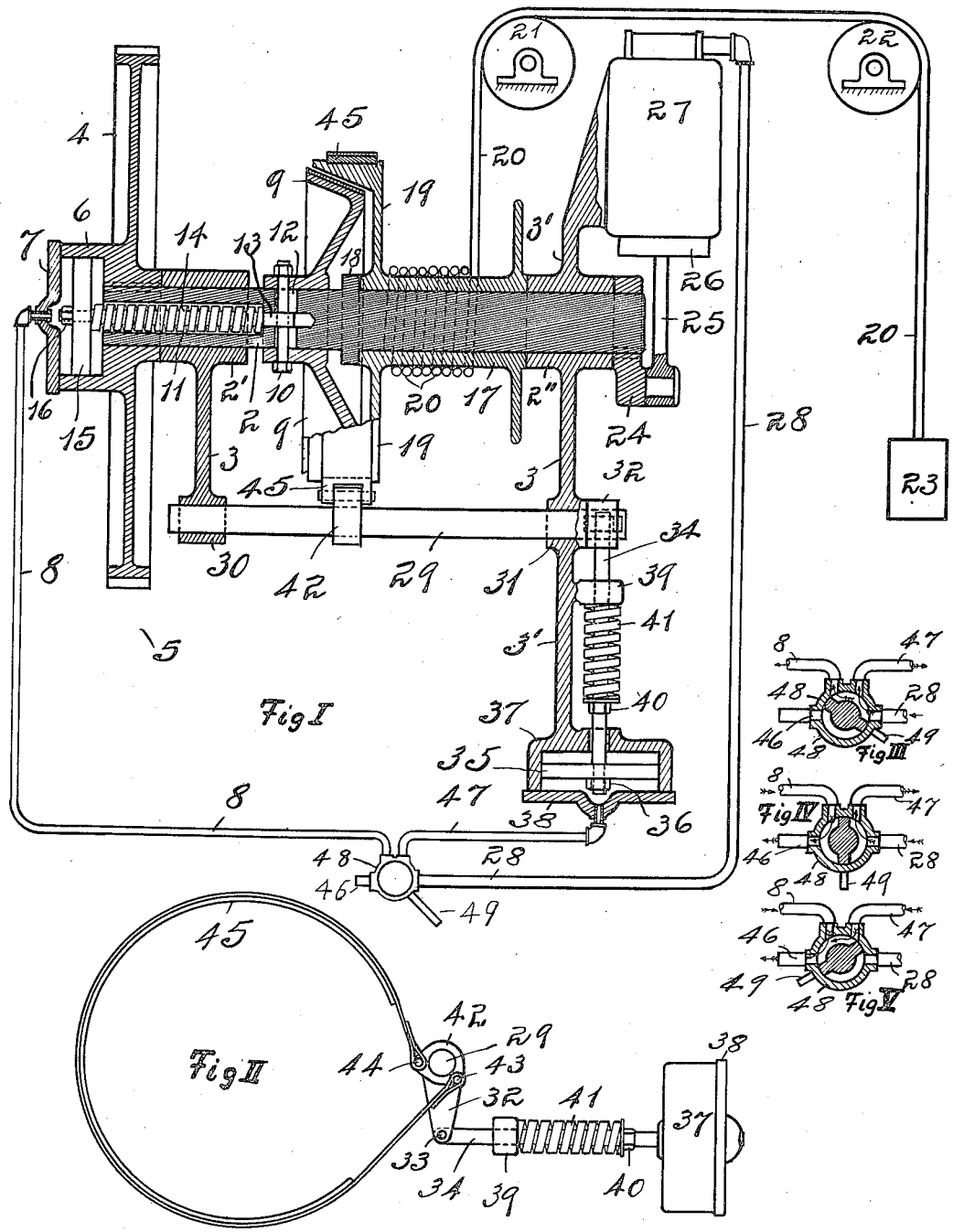
INVENTOR:
Chas. S. Johnson,
BY H. W. Richards.
ATTORNEY

UNITED STATES PATENT OFFICE.

CHARLES SUNDERLAND JOHNSON, OF GALESBURG, ILLINOIS.

MEANS FOR OPERATING AND CONTROLLING BRAKES, CLUTCHES, &c.

1,298,956. Specification of Letters Patent. Patented Apr. 1, 1919.

Application filed May 29, 1917. Serial No. 171,716.

*To all whom it may concern:*

Be it known that I, CHARLES S. JOHNSON, a citizen of the United States, and now a resident of Galesburg, in the county of Knox and State of Illinois, have invented a new and useful Improvement in Means for Operating and Controlling Brakes, Clutches, &c., of which the following is a specification.

My invention relates to means for operating and controlling brakes, clutches and similar devices and it consists, substantially, in the improvements hereinafter described.

One of the objects of this invention is to provide a combination of operating devices for a brake and clutch wherein the clutch will be normally released and the load to be driven will be normally locked in stationary position and whereby fluid pressure must be applied to release the brake and set the clutch and also whereby the release of the fluid pressure will serve to release the clutch and set the brake, thus giving a combination whereby the mechanism will be returned to its safe and normal position in case the supply of fluid pressure fails from any cause whatsoever, all of the foregoing being accomplished without the usual muscular effort required to force the clutch and brake into or out of engagement.

It is another object to provide a three-point control having the features indicated in the objects above recited, together with three features of control, namely:

1. The clutch members will be held engaged, and the brake released;
2. The clutch may be released without setting the brake; and
3. The clutch may be released and the brake set; thus allowing correspondingly the load to be driven; the load to be allowed to drift; and the load to be locked.

Several minor objects will presently appear. Some of these will be obvious and others particularly pointed out.

In the accompanying drawing I have shown a very simple embodiment of my invention, and for the purpose of illustrating its mode of operation have shown also a very simple form of load to be handled. The uses and the natures and characters of the machines with which my improvements may be incorporated are so numerous and so varied that I shall make no attempt herein to recite them. In said drawings:

Figure 1 is a vertical, substantially central section, partly in elevation;

Fig. 2 a detail—an elevation showing the brake-band and the means for controlling it;

Fig. 3, a sectional detail of the valve, shown as in driving position;

Fig. 4, a similar view of the valve, showing it in neutral position; and

Fig. 5, a similar view, showing the valve in locked position.

Coming now to a detailed description of the drawings and referring to each element and, where necessary, to each part thereof, by a distinguishing numeral, uniformly employed, 2 denotes a transmission or power shaft supported in bearings 2', 2" in frame-parts 3, 3'. Keyed on the shaft 2 is a gear-wheel 4 driven by a suitable drive-pinion. Integral with the wheel 4 is a cylinder 6 the head 7 of which communicates with a pipe 8 presently described.

9 designates the male member of a cone-clutch. It is held from rotation on and relatively to the shaft 2 by a bolt 10 which passes through both and which shall soon be more fully described. At one end the shaft 2 is provided with an axially arranged pocket 11 which is constricted at its inner end. Said pocket crosses a slot 12 arranged transversely of and in the shaft 2. A piston rod 13 works through the pocket 11, its inner end seated in the constricted end thereof. One end of an expansion spring 14 bears against the annular shoulder at the junction of the major and minor parts of the pocket 11, and its other end rests against a piston-head 15 secured on the rod 13 by means of a nut 16. The bolt 10 passes through a transversely arranged aperture in said rod, and is slidably mounted in slot 12.

A drum 17 is mounted on, to rotate independently of the shaft 2, and is held from endwise movement in one direction thereon by an annular boss 18. Its inner end is shown as integral with the female member 19 of the cone-clutch. 20 designates a cable wound on the drum 17, its flight traversing sheaves 21 and 22, and 23 designates a weight or load of any character whatever.

Fixed on the shaft 2 is a crank-arm 24 which drives the rod 25 of the piston 26 of a compressor or other suitable fluid-pump 27. 28 is an outlet or feed-pipe communicating with the pump 27.

A rock-shaft 29 is mounted in bearings 30, 31 in the frame-pieces 3, 3' respectively. Fixed on it is one end of a lever 32 the other end of which is connected at 33 with one end of a piston-rod 34 the free end of which carries a piston-head 35 secured thereon by a nut 36. The head 35 works in a cylinder the barrel 37 of which is shown as formed integrally with the frame-piece 3' and the head of which is indicated by 38. An apertured boss 39 projects from the frame 3'. Between it and a nut 40 on the rod 34 is held an expansion spring 41.

A double lever 42 is fixed on the shaft 29. Two radially arranged pins 43, 44 thereon are secured the ends of a brake-band 45 which embraces the housing or clutch-member 19.

One part of a three-way control valve 48 is connected with the pipe 28, another with the pipe 8, and the third with the pipe 47. The exhaust port is indicated by 46.

At this point it is to be noted that the normal position may be said to be when the shaft 2 is being driven by the gear-wheel 4, and that normally the fluid pressure pump 25, 26, 27 is operating, being driven by the crank-arm 24.

Normally the control valve is in a position corresponding to Fig. 5, whereby fluid pressure from the pump is shut off from entering the pipes 8 and 47 which lead to the cylinders 6 and 37 respectively, and said pipes are opened through the ports of the valve to the atmosphere, thus making it impossible that fluid pressure above atmospheric pressure be exerted on either piston when the valve is in this position, which, as formerly stated is the normal one of the valve.

By reference to Fig. 2—bearing in mind that no fluid pressure is exerted on the piston 35, and consequently no force from the piston is being exerted on the rod 34, the spring 41 is free to react on said rod by means of the holding-nut and washer thereon forcing the rod in a direction opposite to that in which it was forced when the fluid pressure was acting on the piston-head 35. Said rod is connected to lever 32 and this lever rigidly secured to the rock shaft 29 which has mounted upon it the lever connections 42, these controlling the operation of the brake-band 45. Therefore, the movement of said band will be caused to respond in unison to the movement of the rod 34. As previously stated, the spring 41 is exerting pressure on said rod, and this pressure will be seen to cause the lever 32 to rock or partly rotate the shaft 29 and double-lever 42, tending to reduce the internal diameter and causing it to grip the periphery of the housing 19. Thus it will be seen that normally the force of the spring 41 holds the brake-band set tight to the housing, preventing rotation or other movement thereof and also of the integral winding-drum 17 or other connected load.

Referring to Fig. 1, and bearing in mind that normally no fluid pressure is exerted on the piston-head 15 and consequently no force therefrom is exerted upon the rod 13, the spring 14 is free to react on said rod, through the instrumentality of the head 15 and nut 16, thus forcing the rod in the direction opposite to that in which the fluid pressure forces it, and this causes a corresponding movement of the bolt 10 and thereby release of the cone 9 from the housing 19, the bolt moving in the slot 11. The cone 9 must move both rotatorily and longitudinally, by and in unison with the bolt, and the bolt must move by and in unison with every movement of the piston-rod 13.

When it is desired to actuate the load, (which herein comprises the winding-drum 17, cable 20 and weight 23), the operator throws the valve-lever 49 to the position indicated in Fig. 3, thus permitting fluid to pass from the pump through the valve to operate the piston-heads 35 and 15 and release the brake. The load will now be driven, for the clutch-members 9 and 19 are engaged and the drum will therefore rotate.

Should it now be desired to allow the load to drift the valve will be moved to the position indicated in Fig. 4, whereby the fluid pressure against the piston 15 will be released and the spring 14 will expand and release the cone clutch-member 9 from the housing member 19, by moving the piston-rod and bolt and consequently the cone 9. The fluid pressure against the piston 35 is not interrupted or changed in this position of the valve; therefore the brake remains in its released position. The drum is now in neutral, being engaged by or with neither the clutch nor the brake, and inasmuch as the drum is free to rotate independently of the shaft it will manifest no effort toward checking the movement of the load and the latter will be free to drift independently of any influence from either the brake or the clutch.

Should the operator desire to hold the load stationary, at any desired position, he will move the valve to the position shown in Fig. 5, in which no fluid-pressure is exerted against either piston, as the valve in this position opens the pipes 8 and 47 through the valve ports to the atmosphere. The clutch is now released, owing to the expansion and reaction of the spring 14, and the brake 29—45 is now set owing to the expansion and reaction of the spring 41 and the resultant movements of the piston 35, rod 34, lever 32, and lever 42 with its pins 43, 44, and the load is thus held stationarily and safely.

I desire that it be clearly and fully understood that the structure shown in the accompanying drawings and hereinbefore described is merely illustrative of one embodiment of my invention, and that it is susceptible of vast changes in detail. Therefore I do not limit myself to the specific form herein disclosed, except as pointed out in the appended claims, wherein it is my intention to claim as broadly as is permitted by the state of the art all the novelty inherent in the invention.

I therefore claim:

1. In combination, mating clutch members, means for rotating one clutch member, means normally holding the other clutch member stationary, fluid actuated means adapted to release said stationary clutch member, means normally forcing the clutch members out of engagement, fluid actuated means adapted to force the clutch members into engagement, and means for controlling the two stated fluid actuated means.

2. In combination, mating clutch members, means for rotating one clutch member, a brake normally holding the other clutch member from rotating, fluid actuated means adapted to release said brake, means normally forcing the clutch members out of engagement, fluid actuated means adapted to force the clutch members into engagement, and means for manually controlling the two stated fluid actuated means at will.

3. In combination, mating clutch members, means for rotating one clutch member, a stored energy set brake adapted to hold the other clutch member from rotating, fluid actuated means adapted to oppose and overcome the stored energy set brake and thereby release the brake, stored energy means adapted to force the clutch members out of engagement, opposing fluid actuating means adapted to oppose and overcome the last mentioned stored energy means and force the clutch members into engagement, and means for controlling the two stated fluid actuated means separately or in combination as desired.

4. In combination, mating clutch members, means for rotating one clutch member, a spring set brake adapted to hold the other clutch member from rotating, a fluid actuated mechanism adapted to oppose and overcome said spring and release the brake, a spring mechanism adapted to force and hold the clutch members out of engagement, a fluid actuated mechanism adapted to oppose and overcome the last mentioned spring mechanism and force the clutch members into engagement, and a manually operated valve for controlling at will the admission and release of fluid pressure to and from the two stated mechanisms in the following manner, one position of the valve shutting off the admission of fluid pressure to both mechanisms and opening connections from the mechanisms to the atmosphere to exhaust the pressure; another position of the valve to admit the fluid pressure to the mechanism operating to the brake and opening at the same time the connection from the other mechanism to the atmosphere; and the third position of the valve to admit fluid pressure to both mechanisms to set the clutch and release the brake.

In testimony whereof I hereunto attach my signature, at Galesburg, Illinois, this 25th day of May, 1917.

CHARLES SUNDERLAND JOHNSON.